United States Patent [19]

Walpole

[11] Patent Number: 5,635,152

[45] Date of Patent: Jun. 3, 1997

[54] ACID REGENERATION

[75] Inventor: Ernest A. Walpole, Lambton, Australia

[73] Assignee: Austpac Gold N.L., Sydney, Australia

[21] Appl. No.: 284,521

[22] PCT Filed: Feb. 11, 1993

[86] PCT No.: PCT/AU93/00056

§ 371 Date: Aug. 24, 1994

§ 102(e) Date: Aug. 24, 1994

[87] PCT Pub. No.: WO93/16000

PCT Pub. Date: Aug. 19, 1993

[30] Foreign Application Priority Data

Feb. 12, 1992 [AU] Australia ................. PL 0836

[51] Int. Cl.$^6$ ................. C01B 7/03; C23G 1/36
[52] U.S. Cl. ........... 423/481; 423/488; 423/DIG. 1; 23/313 R; 422/185; 422/189; 422/209
[58] Field of Search ................. 423/481, 488, 423/DIG. 1, 150.3; 23/313; 75/751, 754, 765; 422/189, 209, 185; 25/222; 425/222

[56] References Cited

U.S. PATENT DOCUMENTS

| | | | |
|---|---|---|---|
| 2,471,844 | 5/1949 | Streisoff | 23/155 |
| 2,592,580 | 4/1952 | Loevenstein | 423/633 |
| 2,798,801 | 7/1957 | Kieffer et al. | 23/313 |
| 3,044,852 | 7/1962 | Francis | 422/189 |
| 3,399,964 | 9/1968 | Michels et al. | 423/488 |
| 3,440,009 | 4/1969 | Flood et al. | 423/488 |
| 3,442,608 | 5/1969 | Addinall et al. | 23/154 |
| 3,578,401 | 5/1971 | Ueberic et al. | 23/154 |
| 3,745,207 | 7/1973 | Hansen | 423/DIG. 1 |
| 3,753,687 | 8/1973 | Bare | 75/430 |
| 3,867,515 | 2/1975 | Bohl et al. | 23/313 |
| 3,903,239 | 9/1975 | Berkovich | 423/633 |
| 4,175,952 | 11/1979 | Tolley | 75/101 |
| 4,436,681 | 3/1984 | Barczak et al. | 423/633 |

FOREIGN PATENT DOCUMENTS

| | | |
|---|---|---|
| 422839 | 3/1970 | Australia . |
| 5872786 | of 1987 | Australia . |
| 0186370 | 7/1986 | European Pat. Off. . |
| 5347395 | 4/1978 | Japan . |
| 53-95896 | 8/1978 | Japan ................. 75/751 |
| 63-40728 | 2/1988 | Japan ................. 423/DIG. 1 |
| 1132835 | 11/1968 | United Kingdom . |
| 1156063 | 6/1969 | United Kingdom . |
| 1285083 | 8/1972 | United Kingdom . |
| WO8603521 | 6/1986 | WIPO . |

OTHER PUBLICATIONS

Browning, "Agglomeration: Growing Larger in Applications and Technology", Chemical Engineering, Dec. 4, 1967, pp. 147–169 (Best available copy).

*Primary Examiner*—Ngoc-Yen Nguyen
*Attorney, Agent, or Firm*—Edwin D. Schindler

[57] ABSTRACT

Regeneration of hydrochloric acid by hydrolysis of iron chloride in aqueous solution employs a Pelletiser (5) after preconcentration of acid solution in a "Pre-Evaporator" (1). Pelletiser (5) controls pellet mixture to between 12% and 14% free water by recycling dried solids from Roaster (3), from Screen (7), or from dust removal Cyclone (9), and waste liquid from Preconcentrator (1). Preconcentrator (1) is contacted with superheated gas from Fluid Bed Roaster (3). Rotary Drier (6) dries pellets with a concurrent hot gas stream and the pellets are screened at (7) with oversize being sent to a Mill (8), undersize recycled to Pelletiser (5), and sized feed delivered to Roaster (3). HCl is produced as gas offtake from Preconcentrator (1) and passes via a demisting Cyclone into adiabatic Absorption Process section (11), where weak acid liquor and water (10) are added as required.

11 Claims, 1 Drawing Sheet

ACID REGENERATION

TECHNICAL FIELD

The present invention relates particularly to regeneration of hydrochloric acid from the iron chloride liquor that results from the leaching of iron from ilmenite, to form synthetic rutile. It applies also to regeneration of hydrochloric acid from pickle liquor produced from treating the surface of steel with hydrochloric acid.

The relevant reactions for ilmenite are:

A(i) $FeO\ TiO_2 + 2HCl \rightarrow TiO_2 + FeCl_2 + H_2O$

A(ii) $2FeCl_2 + 2H_2O + 0.5\ O_2 \rightarrow Fe_2O_3 + 4HCl$ (gas)

BACKGROUND ART

Because of the cost of new acid, and/or the cost of disposal of iron chloride liquor, the commercial use of hydrochloric acid as a leachant for ilmenite depends on the availability of a technically viable and cost-effective method of regenerating and recovering the hydrochloric acid.

Regeneration of hydrochloric acid is in common use in the steel industry world-wide. For example the acid is used for cleaning steel and wire before galvanising. This process is known as "pickling" and the resultant liquors, consisting largely of iron chlorides and some free acid, is known as "pickle liquor".

The regeneration technology uses either a spray roasting, (Ruthnet), process, or a fluidised bed, (Lurgi), process, both of which produce by-product iron. The reactions:

B(i) $FeO + 2HCl \rightarrow FeCl_2 + H_2O$

B(i) $2FeCl_2 + 2H_2O + 0.5 O_2 \rightarrow Fe_2O_3 + 4HCl$ (gas)

are essentially similar to those involving ilmenite.

In both cases the acid can be regenerated by hydrolysis of the iron chlorides. Excess water is removed by heat, and the iron oxide as dust, or as a pellet by-product.

Although the hydrolysis reaction is exothermic ($\Delta H800°$ C.$=-112.6kJ\ [-26.9kcal]$) the quantity of water that has to be boiled off requires an external heat source.

The principal difference between regeneration of pickle liquor and ilmenite leach liquor is that a significantly greater volume of liquor has to be processed when ilmenite is leached in commercial quantities, than is commonly necessary in the steel industry.

Simplistically, this requires either a very much larger reactor or multiple reactors for an ilmenite leach operation, the size or number required depending on the volume constraints imposed by reactor design.

The volume of concentrated iron chloride liquor which can be injected into a Lurgi—type fluidised bed reactor is limited by the need to achieve uniform distribution of liquor over the whole fluid bed. A large increase in feed volume cannot be accommodated by simply increasing reactor size (diameter).

As an example, the leach liquor from a 50,000 tonnes per year synthetic rutile production facility is estimated at approximately 54 tonnes per hour. Using the Lurgi pickle liquor regeneration technology, 4 reactors would required. The system described herein would require only a single reactor.

SUMMARY OF THE INVENTION

According to a first aspect of the invention there is provided a process for the treatment of spent acid leach liquor containing iron chloride in aqueous solution including the steps of concentrating the aqueous solution to form a liquid concentrate, and forming the liquid concentrate into pellets. Additionally, the pellets may be dried and sized. The pellets are formed by adding dried solids or liquid, as the case may be.

According to a second aspect of the invention there is provided a process for the regeneration of hydrochloric acid from spent acid leach liquor containing iron chloride in aqueous solution including the steps of in sequence, concentrating the aqueous solution to form a liquid concentrate, pelletising the liquid concentrate to form pellets, and hydrolysis of the pellets in a reactor.

Additionally, the pellets may be dried and sized before hydrolysis in a reactor.

The reactor is preferably a fluidised bed reactor but may also be a rotary kiln or other known type of reactor. The hydrochloric acid given off by the hydrolysis reaction is then recovered in a hydrochloric acid absorption circuit well known in the art.

Preferably, the iron chloride in aqueous solution, the leach liquor, is concentrated to a nominal 250 g/L (grams per liter) of iron (equivalent to 500 g/L of 40%$FeCl_2$).

BRIEF DESCRIPTION OF THE DRAWINGS

A preferred embodiment of the invention will now be described with respect to FIG. 1, which shows a flow sheet of a process according to the invention.

DETAILED DESCRIPTION OF THE PREFERRED EMBODIMENT

Figure 1:
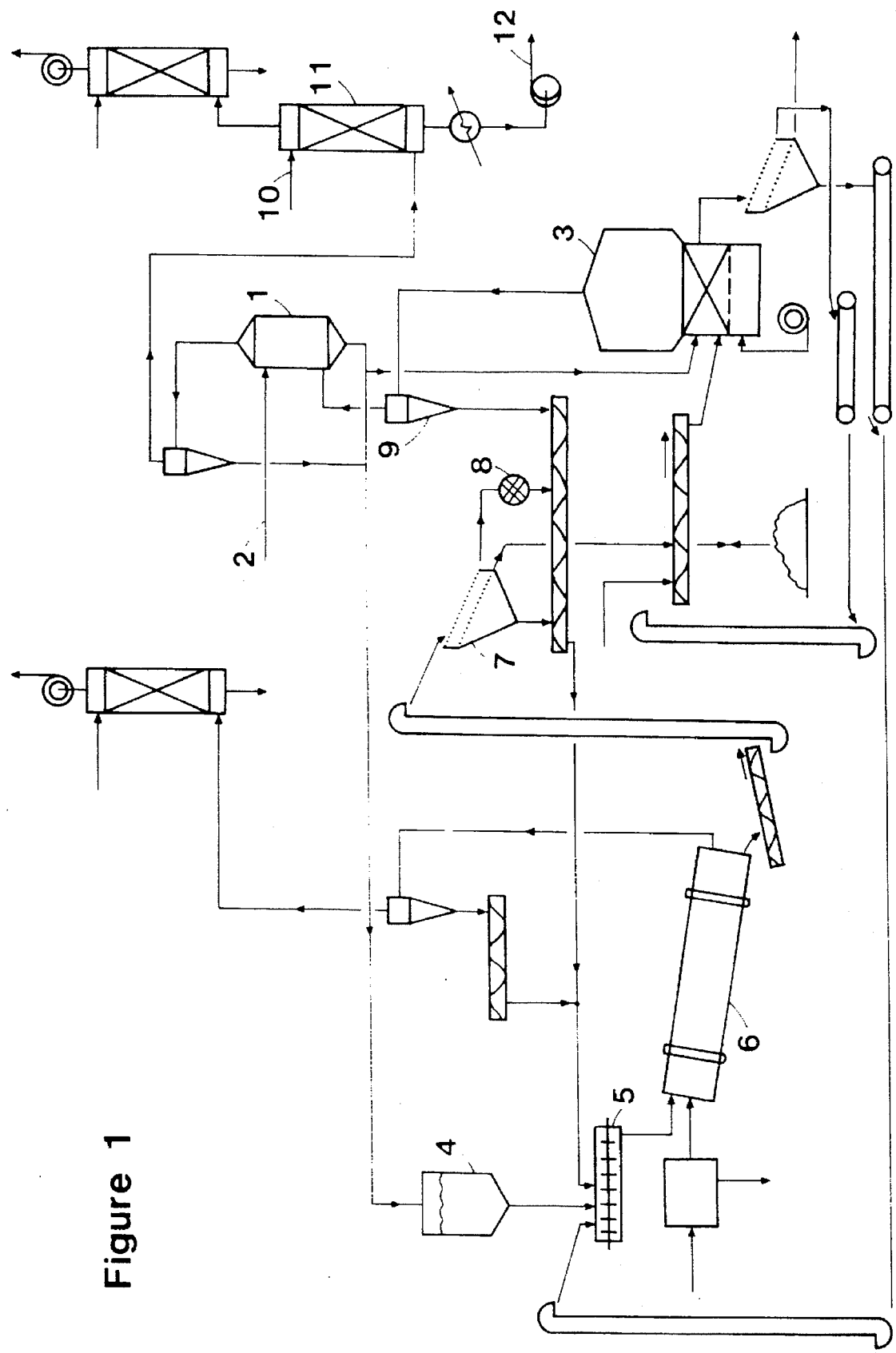

The flow sheet (FIG. 1) is essentially a combination of four integers, each derived from known technologies. The first integer involves concentration of the leach liquor to a nominal 250 g/L of iron. The second is a pelletising and drying process similar to common practice in the fertiliser industry, The third involves hydrolysis by heating the pelletised feed in a fluid bed reactor, and the fourth integer is a normal hydrochloric acid absorption circuit.

The novelty of the inventive process lies in the arrangement of these integers so that the feed to the fluid bed reactor is presented in a pellet form from which most of the uncombined water has been removed, thereby reducing the volume of spent acid to readily manageable proportions. It also allows a closely-sized, reactive feed to be presented to the roaster, giving the added advantage of bed stability in the roaster reaction.

The flow sheet includes the following steps:

a) Preconcentration of 25% $FeCl_2$ spent acid solution by introducing the spent acid into a Lurgi-type "Pre-Evaporator", Preconcentrator (1) by a venturi or spray system (2). and contacting with superheated gas from a Fluid Bed Roaster (3) (step (e)).

b) The concentrated (40%$FeCl_2$–500 g/L) solution is piped to a surge/storage tank (4), and thence to a Pelletiser (5)—a blunger or, alternatively, a rotating disc or drum-type pelletiser. Here the mixture is controlled to between 12% and 14% free water by weight by recycling dried solids from the Roaster (3), from the Screen (7), or from the dust removal Cyclone (9), and waste liquid from the preconcentrator (1).

c) The mixture from the Pelletiser (5) is fed to a Rotary Drier (6) where the pellets are dried with a con-current hot gas stream. Typically, the operating conditions within the drier (6) would be:

| Inlet gas temperature | 600° C.–800° C. |
|---|---|
| Inlet moist solid feed | 50° C.–80° C. |
| Outlet gas temperature | 160° C.–180° C. |
| Outlet dried pellets | 130° C.–150° C. | d) The pellets are screened at (7) with oversize being sent to a Mill (8), and undersize recycled to the Pelletiser (5). The sized feed is delivered to the Roaster (3) where hydrolysis occurs.

e) The superheated gas stream from the Roaster (3) (including HCl, excess $O_2$, diluent $N_2$, and water vapour) is fed back to the Preconcentrator (1) after dust removal for example, by Cyclone (9). In this system, a portion or all of the separated dust may advantageously be returned to the Pelletiser (5). The heat from the stream is used to concentrate the spent acid from the leach plant (step (a)).

f) HCl gas offtake from the Preconcentrator (1) is then delivered via a demisting Cyclone into a standard hydrochloric acid Absorption Process section, where weak acid liquor and water (10) are added as required, and absorbed with the HCl stream in an adiabatic Absorber (11). The output of the Absorber (11) is then preferably cooled before becoming the product, 20% HCl azeotrope (12).

g) The 20% HCl azeotrope (12) is then stored. In processsing ilmenite ores the azeotrope (12) would be recycled to the leach plant to produce synthetic rutile (reaction A(i)). In a steel plant it would be used for pickling (reaction B(i)).

Though the present invention has been described above with respect to a particular embodiment thereof it is be understood that the invention is not limited thereto but is capable of variation within the knowledge of a person skilled in the art.

I claim:

1. A process for the treatment of iron chloride in aqueous solution comprising the steps of, in sequence, concentrating the aqueous solution to form a liquid concentrate, forming the liquid concentrate into pellets, hydrolyzing the pellets in a reactor, thereby forming a hydrogen chloride containing gas.

2. A process as claimed in claim 1 wherein the free water content of the pellets is controlled in a range of 12–14% free water by weight, and wherein after the step of forming the liquid concentrate into pellets, the process further comprises the steps of drying and sizing the pellets before said hydrolyzing step.

3. A process as claimed in claim 2 wherein the free water content of the pellets is controlled in the range of between 12% and 14% free water, by weight, by recycling, to the pelletizing step, dried solids with waste liquid as required, respectively from said sizing step or from said concentrating step, and wherein said sizing of the pellets comprises removing undersized pellets to be recycled to the pelletizing step, and screened pellets being delivered to the reactor; and further comprising the steps of feeding back gaseous products of said hydrolyzing step to said concentrating step and delivering HCl gas offtake from said concentrating step to an adiabatic absorber to recover HCl from the gas offtake.

4. A process as claimed in claim 1 wherein a range of between 12% and 14% free water by weight is controlled in said pellets by adding dried solids with waste liquid, as required, the process further including, after the step of forming the liquid concentrate into pellets, the step of drying the pellets before said hydrolyzing step.

5. A process as claimed in claim 4 wherein said reactor is a fluid bed roaster.

6. A process as claimed in claim 5 wherein the process further comprises feeding back gaseous products of said hydrolyzing step to said concentrating step and delivering HCl gas offtake from said concentrating step to an adiabatic absorber to recover HCl from the gas offtake.

7. A process as claimed in claim 6 wherein said waste liquid is taken from said concentrating step and wherein the process further comprises the step of screening the pellets after drying to remove oversized and undersized pellets, with oversize being sent to a mill, undersize being recycled to the pelletising step as said dried solids, and, the remainder, screened pellets, being delivered to the roaster.

8. A process for the regeneration of hydrochloric acid from spent acid leach liquor containing iron chloride in aqueous solution comprising the steps of:

a) concentrating the spent acid leach liquor by introducing the spent acid leach liquor into a preconcentrator by a venturi or spray system and contacting with superheated gas from the fluid bed roaster of step (e) to form a liquid concentrate;

b) transferring the concentrated solution to a pelletiser of the blunger or a rotating disc or drum wherein pellets are formed from a pellet mixture which is formed and controlled to between 12% and 14% free water by weight by recycling, to the pelletiser, dried solids from the roaster of step (e), from the screening of step (d), or from dust removal cyclone of step (e), with waste liquid from the preconcentrator of step (a), as required;

c) feeding the pellets from the pelletiser to a rotary drier where the pellets are dried with a concurrent hot gas stream with operating conditions within the drier being within the ranges:

| inlet gas temperature | 600° C.–800° C. |
|---|---|
| inlet moist solid feed | 50° C.–80° C. |
| outlet gas temperature | 160° C.–180° C. |
| outlet dried pellets | 130° C.–150° C. | d) screening the pellets with oversize being sent to a mill, undersize being recycled to the pelletiser, and the remainder, screened pellets being delivered to the roaster of step (e);

e) roasting the pellets in a roaster and feeding the superheated gas stream containing HCl, excess $O_2$, diluent $N_2$, and water vapor from the roaster to the preconcentrator after removing dust from the gas stream by a cyclone with a portion or all of the dust being returned to pelletiser and the heat from the gas stream being used to concentrate the spent acid; and, f) delivering the HCl gas offtake from the preconcentrator via a demisting cyclone to an adiabatic absorber where weak acid liquor and water are added to absorb the HCl in the gas offtake, and cooling the output of the absorber to form a HCl azeotrope.

9. A process for the treatment of spent acid leach liquor containing iron chloride in aqueous solution comprising the steps of, in sequence, concentrating the aqueous solution of iron chloride to form a liquid concentrate, and forming pellets from the liquid concentrate by adding dried solids with liquid as required.

10. The pellet product formed in the process of claim 9.

11. An apparatus for the regeneration of hydrochloric acid from spent acid leach liquor containing iron chloride in aqueous solution, comprising:

a) a preconcentrator to concentrate a spent acid leach liquor; means for feeding the spent acid leach liquor into the preconcentrator, wherein said means for feeding the spent acid leach liquor comprises a venturi or spray system; means to recycle a waste liquid from the preconcentrator to the pelletiser of step (b);

b) a blunger or a rotating disc or drum pelletiser; means to feed the concentrated spent acid leach liquor from the preconcentrator to said pelletiser; wherein in the pelletiser, pellets are formed from a pellet mixture which has between 12% and 14% free water by weight by recycling dried solids from the roaster of step (e) or from the screening device of step (d) or from the dust removal cyclone of step (e) with waste liquid from the preconcentrator of step (a), as required;

c) a rotary drier, means to feed the pellets from the pelletiser to the rotary drier wherein the pellets are dried with a concurrent hot gas stream with operating conditions within the drier being with the ranges:

| | |
|---|---|
| inlet gas temperature | 600° C.–800° C. |
| inlet moist solid feed | 50° C.–80° C. |
| outlet gas temperature | 160° C.–180° C. |
| outlet dried pellets | 130° C.–150° C. | d) a screening device for the dried pellets, means to deliver the dried pellets from the rotary drier to the screening device, means to send the oversize to a mill, means to recycle the undersize to the pelletiser, and means to deliver the remainder, screened pellets to the roaster of step (e), where hydrolysis occurs;

e) a roaster for hydrolyzing the pellets, means to deliver the superheated gas stream containing HCl, excess $O_2$, diluent $N_2$, and water vapor from the roaster to the preconcentrator, the heat from the gas stream used to concentrate the spent acid leach liquor, wherein said means to deliver the superheated gas stream includes a cyclone between the roaster and the preconcentrator to remove dust from said gas stream and means to recycle at least a portion of the dust to the pelletiser; and, f) a HCl absorber, means to deliver the HCl gas offtake from the preconcentrator to the HCl absorber wherein said means to deliver the HCl gas offtake contains a demisting cyclone between the preconcentrator and the HCl absorber.

\* \* \* \* \*